United States Patent [19]

Parks

[11] Patent Number: 4,963,859

[45] Date of Patent: Oct. 16, 1990

[54] METHOD AND APPARATUS FOR CAPTURING INFORMATION IN DRAWING OR WRITING

[75] Inventor: John R. Parks, Ringwood, England

[73] Assignee: National Research Development Corporation, London, England

[21] Appl. No.: 150,249

[22] Filed: Jan. 29, 1988

[30] Foreign Application Priority Data

Feb. 2, 1987 [GB] United Kingdom ............... 8702302

[51] Int. Cl.$^5$ ............................................. G09G 1/00
[52] U.S. Cl. ................................... 340/712; 340/706; 341/20; 382/3
[58] Field of Search ............... 340/706, 712; 341/20, 341/31; 178/18, 19; 250/221; 382/3, 13, 59

[56] References Cited

U.S. PATENT DOCUMENTS

| | | |
|---|---|---|
| 3,539,717 | 11/1970 | Baker . |
| 3,903,502 | 9/1975 | Moss . |
| 3,955,178 | 5/1976 | Warfel . |
| 4,122,435 | 10/1978 | Greenaway . |
| 4,136,821 | 1/1979 | Sugiura et al. . |
| 4,227,044 | 10/1980 | Fencl . |
| 4,254,333 | 3/1981 | Bergstrom . |
| 4,281,313 | 7/1981 | Boldridge, Jr. ............... 382/3 |
| 4,475,240 | 10/1984 | Brogardh et al. . |
| 4,484,179 | 11/1984 | Kasday ..................... 340/712 |
| 4,542,375 | 9/1985 | Alles et al. ................. 340/712 |
| 4,560,830 | 12/1985 | Perl . |

FOREIGN PATENT DOCUMENTS

| | | |
|---|---|---|
| A0035036 | 9/1981 | European Pat. Off. . |
| 0094867 | 11/1983 | European Pat. Off. . |
| 0122673 | 10/1984 | European Pat. Off. . |
| A0132241 | 1/1985 | European Pat. Off. . |
| 1012445 | 12/1965 | United Kingdom . |
| 1376742 | 12/1974 | United Kingdom . |
| 1480066 | 7/1977 | United Kingdom . |
| 1525259 | 9/1978 | United Kingdom . |
| 1528578 | 10/1978 | United Kingdom . |
| 2117154 | 10/1983 | United Kingdom . |
| 2133139 | 7/1984 | United Kingdom . |
| 2154734 | 9/1985 | United Kingdom . |
| 2183071 | 5/1987 | United Kingdom . |
| 2201240 | 8/1988 | United Kingdom . |
| 8604704 | 8/1986 | World Int. Prop. O. . |

OTHER PUBLICATIONS

IBM Technical Disclosure Bulletin, vol. 18, No. 7, Dec. 1978 (New York, U.S.A.), S. A. Darringer et al.: "Speed Pen", p. 2374.
IBM Technical Disclosure Bulletin, vol. 18, No. 10, Mar. 1976 (New York, U.S.A.), C. H. Bajoreck et al.: "Signature Recognition System Transducer", p. 3484.

*Primary Examiner*—Alvin Oberley
*Assistant Examiner*—M. Fatahigar
*Attorney, Agent, or Firm*—Cushman, Darby & Cushman

[57] ABSTRACT

Where a signature is to be automatically verified, or data is to be entered into a computer, a special pen is usually employed but this pen is liable to be stolen or vandalized. In the present invention the tip of an ordinary pen presses lined paper on to a transparent plate and modifies internal reflection in the plate at the point of contact. A light source edge-illuminates the plate and light received by a receiver at another edge of the plate varies in intensity as the pen tip crosses the lines. By measuring the intervals between crossing line boundaries information is obtained which can be analyzed for use in signature verification and data entry.

24 Claims, 1 Drawing Sheet

METHOD AND APPARATUS FOR CAPTURING INFORMATION IN DRAWING OR WRITING

BACKGROUND OF THE INVENTION

The present invention relates to methods and apparatus for generating signals as writing or drawing is carried out, the signals being dependent on the way in which the writing or drawing is carried out.

FIELD OF THE INVENTION

Signature verification methods are known in which the dynamic characteristics of the signature (characteristics obtained while the signature is being written) are used in signature verification. The present invention is expected to be particularly useful in such signature verification systems, these systems being of application to monetary transfers and data entry, for example.

A method and apparatus for generating signals as writing or drawing is carried out is described in British Application No. 8626411 (PCT Application GB No. 86/00681). However, the method and apparatus described in these earlier specifications usually relies on the use of a special pen which might be vandalized or stolen.

SUMMARY OF THE INVENTION

According to a first aspect of the present invention there is provided a method of obtaining information as writing or drawing is carried out, comprising the steps of writing or drawing on a surface which is arranged to vary contact conditions at an interface between a flexible sheet and transparent (or translucent) material, using a tip of an instrument which contacts the surface, the interface having marks spread across a region where use of the writing instrument affects the said contact conditions, supplying light to one side of the interface, and sensing variations in light internally reflected at the inteface, due to the presence of the marks, as contact conditions are changed by the tip when writing or drawing is being carried out.

An advantage of the method according to the present invention is that the drawing instrument may be a conventional pen or pencil and the remainder of the apparatus used may be fixed in place and is comparatively difficult to vandalize.

The method of the invention may also include temporal and/or spatial analysis of the mark crossings, for instance for signature verification or data capture. Some techniques are discussed in British Patent No. 1480066 and the above mentioned application.

The surface is usually the surface of a medium, such as paper, on which writing or drawing is carried out. This medium may form the flexible sheet, or the flexible sheet may be a transparent (or translucent) sheet, on which the medium is placed.

The marks are preferably parallel lines which need not be visible to the human eye so long as they are substantially opaque (or absorptive) to the light sensed. When a medium is used as the flexible sheet, the marks may be on the lower surface of the medium or, if the medium is reasonably translucent, on the upper surface thereof. An advantage is obtained if the marks are on the surface of the said material, or on the flexible sheet, where the sheet does not include the writing surface, since then ordinary unmarked paper can be used. The marks may be made using material which re-radiates at a different wavelength from incident radiation, for example fluorescent or phosphorescent material. Such a change in wavelength is sometimes helpful in distinguishing between light from the lines and light supplied to the interior of the material.

The material may be in the form of a plate of transparent material such as glass, acrylic or transparent plastic material, with a source supplying light arranged along one or more edges of the plate, light variations being sensed along another edge or edges.

According to a second aspect of the present invention there is provided apparatus for use in obtaining information when writing or drawing is being carried out, comprising a surface on which writing or drawing can be carried out or on which a medium for writing or drawing can be placed, transparent (or translucent) material supporting the surface and having, in operation, an interface with a flexible sheet at which contact conditions in a region vary as writing or drawing takes place, the interface having marks spread across the said region, means for supplying light to one side of the interface, and means for sensing variations in the intensity of light internally reflected at the interface due to the presence of marks as the said contact conditions change when writing or drawing is carried out.

As mentioned above the said material may be in the form of a relatively thick edge-illuminated transparent plate. The means for sensing variations may include a light receiver positioned along an edge of the plate, or alternatively, the means for sensing variations may include a reflecting surface shaped to conform with the internal surface of any regular segment of a sphere. A light receiver is positioned to sense light within the part spherical surface which is preferably hemispherical, and the part spherical surface is positioned adjacent to the surface of the transparent (or translucent) material opposite the writing or drawing surface. With such an arrangement the positions of the light source and the light receiver may be interchanged.

According to a third aspect of the present invention there is provided a method of obtaining information as writing or drawing is carried out, comprising the steps of writing or drawing on a surface which is supported by transparent (or translucent) material using a tip of an instrument, marks being spread across the region where the writing instrument is to be used, and having the property of emitting light having a first wavelength when excited by light having a second wavelength, supplying light having the second wavelength to the said surface, and sensing variations in light at the first wavelength due to the tip crossing the marks, as writing or drawing is carried out.

According to a fourth aspect of the present invention there is provided a method of obtainign information as writing or drawing is carried out, comprising the steps of writing or drawing on a surface which is supported by transparent (or translucent) material using the tip of an instrument, the surface being marked by a set of parallel lines arranged in adjacent identical groups, with each group containing lines of at least three different thicknesses, supplying light to the said surface, sensing variations in light due to the tip crossing the lines as writing or drawing is carried out, deriving signals representing the widths of the lines, and employing the said signals to determine the direction of the component of the movement of the tip orthogonal to the lines.

To determine directions of movement components parallel to different axes, two sets of parallel lines each orthogonal to a respective axis may be used but each group in each set must then contain lines of at least four different thicknesses and the thicknesses must present different sequences in the different directions.

Preferably the lines of the, or each, set have substantially equally spaced axes.

The invention also includes apparatus corresponding to the method of the third and fourth aspects of the invention.

BRIEF DESCRIPTION OF THE DRAWINGS

Certain embodiments of the invention will now be described, by way of example, with reference to the accompanying drawings, in which.

DETAILED DESCRIPTION OF THE INVENTION

Figure 1:
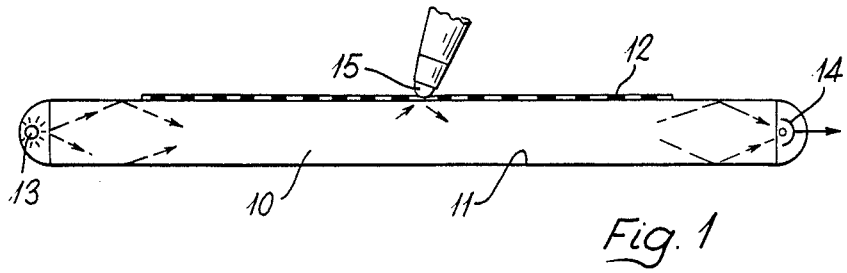
FIG. 1 is a drawing showing a first embodiment of the invention employing a glass plate in which internal reflection takes place.

In FIG. 1 a glass plate 10 is used as a support for documents such as the document 12 on which, for example, signatures are written. A light source 13 is positioned along one edge of the plate 10 to inject light into the plate where it travels by internal reflection to a light receiver 14, assuming that the plate 10 is supported in such a way that internal reflection at its lower surface 11 is not affected. If the surface 11 is mirrored to reflect light back into the plate 10 then the plate can be supported directly from below. As a pen is used to write a signature, a pressure of the order of several tonnes per square centimeter is exerted by a pen tip 15 and this pressure is transferred through the document to the supporting plate 10. Where this pressure reaches the plate it modifies the contact conditions between the document and the plate. Since internal reflection depends on desnity change across an interface a loose contact, which may amount to very little contact, and a contact applied with considerable pressure, allow different degrees of internal reflection. Where the contact is intimate the term 'optical contact' is used and there is a large difference in internal reflection relative to absence of contact. As shown the document has printed opaque or absorptive stripes or lines which when pressed into contact with the plate also modify the degree of internal reflection at the point where the tip 15 causes optical contact. Thus the light received by the receiver 14 is modulated each time a stripe or line is crossed and this information can be analyzed in order to give temporal and spatial information about the signature written on the document.

Figure 2:
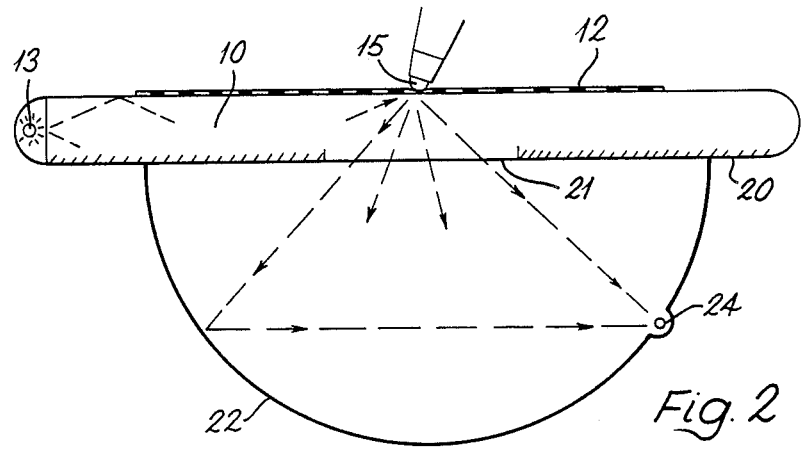
FIG. 2 shows a second embodiment of the invention employing an integrating hemisphere.

An alternative arrangement is shown in FIG. 2 where as before the glass plate 10 supports the document 12 on which signatures are written. Once again the document 12 contains opaque stripes or lines. The lower surface 20 of the plate has a mirrored surface except within a window 21 in which signatures are to be written. An integrating hemisphere 22 with an internal diffusely reflecting surface is positioned below the plate 10 and the mirrored surface 20 reflects light back into the hemisphere. An integrating sphere is a known optical device in which a sphere is internally coated with a diffusing coating so that any light introduced into the sphere is distributed uniformly over the whole internal surface. In fact any regular segment of a sphere can be used if the radial sides of the segment are formed of specular reflectors (i.e. mirrors). Thus an integrating hemisphere is a diametral cap closed with a mirror which then functions like a full sphere but is smaller. The window 21 in the diametral mirror 20 modifies this situation but only marginally.

Most of the light from the source 13 will be reflected internally within the plate 10 but some light is reflected through the window 21 due to the tip 15 bringing the document 12 into optical contact with the plate 10 and the consequent scattering of light at the point of contact. The amount of light passing out of the plate 10 through the window 21 depends on the nature of the document at the point where pressure is applied by the tip 15: that is whether it is transparent, opaque, absorptive or reflective. These variations are sensed by a light receiver positioned in the hemisphere 22 and indicate when the pen tip crosses a stripe or line. In an alternative to the arrangement of FIg. 2 the positions of the light source 13 and the light receiver 24 may be interchanged.

The stripes or lines may be on the plate 10 instead of the document 12 in the arrangements of FIGS. 1 and 2.

In a third embodiment of the invention, "fish tails" 26 and 27 (see FIGS. 3a and 3b) made up of large numbers of optical fibers are joined at their wide ends along opposite sides of a transparent resin sheet 28. Each fiber is optically coupled into the edge of the sheet 28. At the narrow ends of the "fish tails", the fibers are assembled in bundles 29 and 30 and optically coupled to light receivers 32 and 33. The resin sheet can be cast between two glass plates (not shown) with the wide ends of the "fish tails" sandwiched between the plates but spaced apart to define a space for the resin. When the resin has hardened the glass plates are removed.

A transparent plastics or glass block 34 is located below the resin sheet 28 and preferably has mirrored surfaces to provide internal reflection except where adjacent to the sheet 28 and where a light source 35 is attached. Alternatively, the mirrored surfaces may be diffusely reflecting, for example white. In either arrangement operation is similar to FIG. 2 since light in the block 34 can only enter or exit along the interface with the sheet 28 or through the aperture at the source 35. Thus the block 34 forms light-direction means directing light from the source 35 to the sheet 28. Several light sources may be located on any of the mirrored surfaces, each with its own aperture, to supplement the source 35.

In operation, a pen or stylus is used to sign, write or draw on a paper sheet 36 which is in loose contact with the sheet 28. Either the lower surface of the sheet 28 or the upper surface of the block 34 carry spaced apart lines which are preferably as widely spaced as they are thick.

When the pen or stylus applies pressure to the sheet 36, internal reflection at teh interface between the block 34 and the sheet 28 is varied and light passing through the interface (unlike FIGS. 1 and 2) to the receivers 32 and 33 varies. Further, as the pen or stylus if moved over the paper sheet 36 and the lines are crossed, the ligh received by the light receivers is modulated.

Figure 3A:
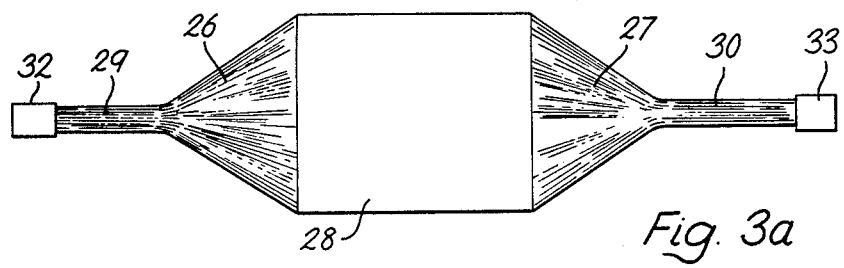
FIG. 3a is a plan view of part of a third embodiment of the invention employing optical fibers to gather internally reflected light.
Figure 3B:
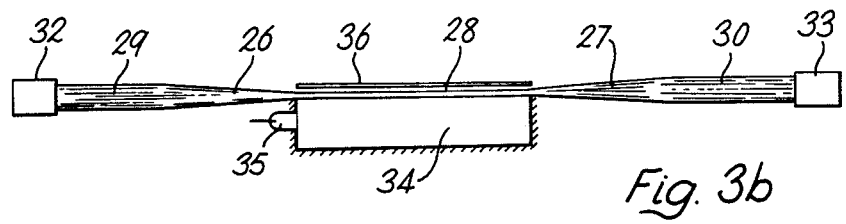
FIG. 3b is a side view of the third embodiment.

An advantage of the arrangement of FIGS. 3a and 3b is that most extraneous light incident on the sheet 28 passes through to the block 34 instead of reaching the receivers 32 and 33. However the alternative can be used in which a light source is coupled to optical fibres and a light receiver is coupled to the block 34. More than two "fish tails" can be used, for example further fish tails can be attached to the other sides of the sheet 28.

As mentioned above variations can be analyzed to provide information relating to the nature of the signatuures or other writing carried out on the document. For example, signals from the light receiver 14 or 24, or the receivers 32 or 33 may be passed to first and second threshold detectors (not shown) which determine, respectively, whether the signal received indicates that the tip of the pen or stylus is in contact with the paper, and whether the tip is in contact with the lines or the spaces between lines. EAch time a boundary between a line and a space is crossed a counter (not shown) coupled to a clock circuit (not shown) is read out and then reset, under the control of the second threshold detector, to provide digital signals indicating the durations of the intervals in which the pen or stylus traverses lines and spaces. These intervals indicate the speed at which the pen or stylus crosses the paper but are also dependent on the direction of traverse and length of writing strokes. Thus the intervals are representative of the dynamic and spatial characteristics of a person's signature and also of individual data characters especially digits.

The durations of intervals for which the pen or stylus is out of contact with the paper are also indicated by another digital signal under the control of the first threshold detector. This digital signal is also useful in signature recognition and data recognition. Both digital signals are passed to a computer (not shown) which is programmed to carry out the analysis required. The techniques described in PCT Application GB No. 86/00681 and UK Patent Specification No. 1480066 are useful in this respect.

The light need not be visible to the human eye and therefore the lines or stripes on the document need not be visible although they must be suubstatially opaque to the light employed by the illuminating source. The lines or stripes may be in sets of parallel lines with an angle, usually preferably 90°, between lines in different sets. Alternatively the lines may be replaced by dots for example in an array with the dots at the vertices of regular polygons.

The pen used can usually be any conventional type, or a pencil or simply a stylus may be used. Analysis may be carried out as described in the above mentioned patent or application, the latter having an explanation of how lines in different groupings or colors can be used to indicate the position of the tip of a pen or its direction of traverse across a group of lines. For this purpose it may be necessary to use several differently colored light sources in place of the source 13 or a single source with colors corresponding to the colors of different lines. A number of light receivers which are selectively responsible to the different colors are also required to replace the light receiver 14.

The amount of data captured as the pen moves can be increased by determining the direction of movement and an alternative method to that mentioned in the said application is now described. If the lines on the paper are parallel, have three different widths and are arranged in the order a,b,c,a,b,c ... etc. where a, b and c refer to line widths preferably with $a>b>c$, then components of movement in two opposite directions at right angles to the lines can be distinguished. With two orthogonal sets of parallel lines each having four different widths a, b, c and d then opposite directions of movement parallel to orthogonal axes can be distinguished. If line widths have the relationship $a>b>c>d$ then the lines may have the sequence a,b,c,d, parallel to one axis and a,c,b,d parallel to the other axis. In general to distinguish two directions two widths in the sequence for one direction can be transposed to give the sequence for the other direction.

Where parallel lines of differing widths are employed it is useful if the axes of the lines are equally spaced, since then, if the pen or stylus tip moves in a straight line, the total time it is in contact with a space is equal to the total time it is in contact with a line. Another useful line arrangement which can be designed to have the same advantage, has corresponding line boundaries on one side of each line equally spaced while corresponding boundaries on the other sides are in selected modular positions giving the required line widths. Detection of movement is simplified and is determined by sensing, for example, whether all white to black boundaries are evenly spaced in time; if so then movement is in one direction, if not then it is in the other direction.

A technique for determining pen direction in one component direction is now described. A signal is derived which indicates when the edge of a line is crossed by the pen (for example by differentiating the signal from the light receiver and when the open movement has a component orthogonal to the lines in one direction the edge indications are spaced by intervals proportional to the thicknesses a,b,c,a,b, ... , respectively, as each line is crossed. A component of movement in the opposite direction gives intervals proportional to c,b,a,c,b,a. Thus by storing these intervals and comparing their magnitudes the direction of the said component of pen movement can be found. A microprocessor with read-only and random-access memory is easily programmed to carry out the process of storage and comparison but the process is usually only required after the pen may have changed direction. By detecting zero velocity in the said component, for example by determining when the differential of the line crossings per unit time falls to zero, likely times for direction changes can be found.

I claim:

1. A method of obtaining information as writing or drawing is carried out, comprising the steps of:
    writing or drawing on a surface which is arranged to vary the intimacy of contact at an interface between a flexible sheet and transparent (or translucent) material, using a tip of an instrument which contacts the surface, the interface having marks spread across a region where use of the writing instrument affects the said intimacy of contact, supplying light to one side of the interface, and sensing variations in light internally reflected at the interface, due to the presence of the marks, as the intimacy of contact is changed by the tip when writing or drawing is being carried out.

2. A method according to claim 1 wherein the marks include parallel lines or stripes.

3. A method according to claim 1 wherein
the light supplied to the interior of the material has a first wavelength,
the marks radiate light having a second wavelength when irradiated with light having the first wavelength, and
the light variations are sensed in light having the second wavelength.

4. A method according to claim 1 wherein the said surface is the surface of the said sheet and the marks are on the lower surface of the sheet or on the upper surface of the said material.

5. A method according to claim 1 wherein the said surface is the surface of a medium placed on the said sheet and the sheet is transparent or translucent.

6. A method according to claim 5 wherein the marks are on the lower surface of the sheet or on the upper surface of the said material.

7. A method according to claim 2 wherein the lines or stripes have equally spaced centers and are arranged in adjacent identical groups with each group containing lines of at least three different thicknesses, and the method includes distinguishing components of movement of the tip orthogonal to the lines or stripes.

8. A method according to claim 2 wherein the lines or stripes are arranged in adjacent identical groups with each group containing lines of at least three different thicknesses, corresponding boundaries between lines or stripes being equally spaced on one side of all lines or stripes, and the method includes distinguishing components of movement of the tip orthogonal to the lines or stripes.

9. A method according to claim 2, a plurality of sets of parallel lines or stripes employed.

10. Apparatus for use in obtaining information when writing or drawing is being carried out, comprising:
a surface on which writing or drawing can be carried out or on which a medium for writing or drawing can be placed,
transparent (or translucent) material supporting the surface and having, in operation, an interface with a flexible sheet at which the intimacy of contact between the material and the sheet varies in a region as writing or drawing takes place, the interface having marks spread across the said region,
means for supplying light to one side of the interface, and
means for sensing variations in the intensity of light internally reflected at the interface due to the presence to marks as the said intimacy of contact changes when writing or drawing is carried out.

11. Apparatus according to claim 10 including the said medium wherein the medium forms the said flexible sheet and carries marks comprising parallel lines or stripes.

12. Apparatus according to claim 10 including the said flexible sheet, wherein the lower surface of the sheet or the upper suurface of the material carries marks comprising parallel lines or stripes.

13. Apparatus according to claim 11 wherein
the means for supplying light, in operation, supplies light having a first wavelength,
the marks comprise a substance which when irradiated with light of the first wavelength, radiates light having a second wavelength, and
the means for sensing light intensity variations being sensitive to light having the second wavelength.

14. Apparatus according to claim 10, the said material being in the form of a plate, the means for supplying light projects light into an edge of the plate, and/or the means for sensing light variations receives light from an edge of the plate.

15. Apparatus according to claim 10, the human eye not being sensitive to light supplied by the means for supplying light but the means for sensing light variations being sensitive to the light so supplied.

16. Apparatus according to claim 12 wherein
the means for supplying light, in operation, supplies light having a first wavelength,
the marks comprise a substance which when irradiated with light of the first wavelength, radiate light having a second wavelength, and
the means for sensing light intensity variations being sensitive to light having the second wavelength.

17. Apparatus according to claim 10 including the said flexible sheet and at least one group of optical fibers with one end of each fiber optically coupled to the said sheet along one edge thereof and the means for supplying light or the means for sensing variations optically coupled to the other ends of the fibers.

18. A method of obtaining information as writing or drawing is carried out, comprising the steps of
writing or drawing on a surface which is supported by transparent (or translucent) material using the tip of an instrument, the surface being marked by a set of parallel lines arranged in adjacent identical groups, with each group containing lines of at least three different thicknesses,
supplying light to the said surface,
sensing variations in light internally reflected at the surface due to the tip crossing the lines as writing or drawing is carried out,
deriving signals representing the widths of the lines, and
employing the said signals to determine the direction of the component of the movement of the tip orthogonal to the lines.

19. Apparatus according to claim 10, the said material being in the form of a plate, and the apparatus including reflecting surfaces positioned outside the plate to reflect, to the means for sensing light variations, light passing through that surface of the material being remote from the said surface due to the said changes in intimacy of contact, and the means for supplying light being positioned to supply light to be internally reflected in the plate.

20. Apparatus according to claim 10, the said material being in the form of a plate, and the apparatus including reflecting surfaces positioned outside the plate to reflect light from the means for supplying light through that surface of the material being remote from the said surface, the means for sensing light variations being positioned to receive light internally reflected in the plate due to the said changes in intimacy in contact.

21. Apparatus according to claim 10, the said material being in the form of a plate and the apparatus comprising a diffusing reflector shaped to conform with the interior of a regular segment of a sphere, the means for supplying light being positioned to supply light to one edge of the plate, the diffusing reflector being positioned adjacent to that face of the plate being remote from the said surface to receive light which, due to the said changes in intimacy of contact, is not internally reflected in the plate, and the means for sensing light variations being positioned to receive light from the diffusing reflector.

22. Apparatus according to claim 21, the regular segment being a hemisphere, and the said face of the plate being positioned across the open diameter of the hemisphere and forming a partial specular reflector capable of reflecting light into the hemisphere.

23. Apparatus according to claim 10, said material being in the form of a plate and the apparatus comprising a diffusing reflector shaped to conform with the interior of a regular segment of a sphere, the means for supplying light being positioned to transmit light to the diffusing reflector, the diffusing reflector being positioned adjacent to that face of the plate and being remote from the said surface to transmit light to the plate, and the means for sensing light variations being positioned to receive light internally reflected in the plate due to the said changes in intimacy of contact.

24. Apparatus according to claim 23, the regular segment being a hemisphere, and the said face of the plate being positioned across the open diameter of the hemisphere and forming a partial specular reflector capable of reflecting light into the hemisphere.

* * * * *